(12) United States Patent
Serra et al.

(10) Patent No.: US 6,354,149 B1
(45) Date of Patent: Mar. 12, 2002

(54) METHOD FOR DETERMINING THE PROGRESSION OF THE LOAD TORQUE IN AN INTERNAL-COMBUSTION ENGINE

(75) Inventors: Gabriele Serra, Lazzaro di Savena; Roberto Flora, Forli'; Giorgio Minelli, Bologna; Piero Azzoni, Larraro di Savena; Davide Moro, Bologna, all of (IT)

(73) Assignee: Magneti Marelli SpA, Milan (IT)

( * ) Notice: Subject to any disclaimer, the term of this patent is extended or adjusted under 35 U.S.C. 154(b) by 0 days.

(21) Appl. No.: 09/393,875

(22) Filed: Sep. 10, 1999

(30) Foreign Application Priority Data

Sep. 10, 1998 (IT) .......................................... BO98A0524

(51) Int. Cl.[7] ............................................. G01M 15/00
(52) U.S. Cl. ......................................... 73/117.3; 73/115
(58) Field of Search ........................... 73/117.3, 118.1, 73/116, 115; 123/32

(56) References Cited

U.S. PATENT DOCUMENTS 4,153,013 A * 5/1979 Bianchi et al. ............... 123/32
4,987,770 A * 1/1991 Nanyoshi et al. ............. 73/115
5,400,648 A * 3/1995 Mahr .......................... 73/115

FOREIGN PATENT DOCUMENTS

| EP | 0 199 431 A2 | 10/1986 | |
| EP | 0 615 117 A2 | 9/1994 | |
| GB | 0615117 A2 * | 9/1994 | ............. G01L/3/00 |

* cited by examiner

Primary Examiner—Benjamin R. Fuller
Assistant Examiner—Maurice Stevens
(74) Attorney, Agent, or Firm—Venable; Robert Kinberg; Chad C. Anderson

(57) ABSTRACT

Method for determining the progression of the load torque in an internal-combustion engine, comprising, for each combustion cycle of the engine, the steps of detecting the progression of the instantaneous angular velocity of the crankshaft in at least one given time interval of the combustion cycle; determining the progression of the pressure inside the cylinders of the engine for the combustion cycle on the basis of the progression of the instantaneous angular velocity; and determining the progression of the load torque for the combustion cycle on the basis of the progression of the instantaneous angular velocity and the pressure inside the cylinders.

15 Claims, 4 Drawing Sheets

US 6,354,149 B1

METHOD FOR DETERMINING THE PROGRESSION OF THE LOAD TORQUE IN AN INTERNAL-COMBUSTION ENGINE

The present invention relates to a method for determining the progression of the load torque in an internal-combustion engine.

BACKGROUND OF THE INVENTION

Methods are known for determining the progression of the load torque applied to an internal-combustion engine during a combustion cycle of the engine, whereby the progression of the load torque is obtained both as a function of the progression of the angular velocity of the engine during the combustion cycle itself and as a function of the progression of the pressure inside at least one cylinder.

In particular, these methods envisage the use of at least one sensor outside the engine block so as to be able to reconstruct the progression of the pressure inside the cylinder. In fact, in some cases, a pressure sensor is mounted directly inside the combustion chamber of the cylinder so as to output a signal indicating the internal pressure. In other cases, the pressure inside the cylinder is obtained by means of a piezoelectric accelerometer mounted on the engine block, opposite the cylinder, so as to output an electric signal representing the vibrations of the engine block, which, as is known, are directly correlated to the progression of the internal pressure.

Therefore, the said methods for determining the load torque require a sensor outside the engine block, which generally involves not insignificant costs due to the sensor as such, the installation operations and any modifications which must be performed to the engine block in order to provide the seats suitable for receiving said sensor. Moreover, both the pressure sensor and the accelerometer, in view of the hostile conditions of the environment in which they operate, are subject to continuous mechanical and/or thermal stresses which could adversely affect the correct functioning thereof as well as reduce their average working life.

SUMMARY OF THE INVENTION

The object of the present invention is that of providing a method for determining the progression of the load torque in an internal-combustion engine, which does not have the drawback described above and by means of which it is possible to determine the load torque without modifying the engine block and without the aid of sensors outside the engine block itself.

According to the present invention, a method for determining the load torque in an internal-combustion engine is provided, characterized in that it comprises the steps of detecting the progression of a physical parameter indicating the instantaneous angular velocity of the said engine; determining the progression of the pressure inside at least one cylinder of the said engine as a function of the progression of the said physical parameter; and determining the progression of the said load torque as a function of the progression of the said physical parameter and the progression of the said internal pressure.

BRIEF DESCRIPTION OF THE DRAWINGS

The present invention will now be described with reference to the accompanying drawings, which illustrate a non-limiting example of embodiment thereof and in which.

DETAILED DESCRIPTION OF THE INVENTION

Figure 1:
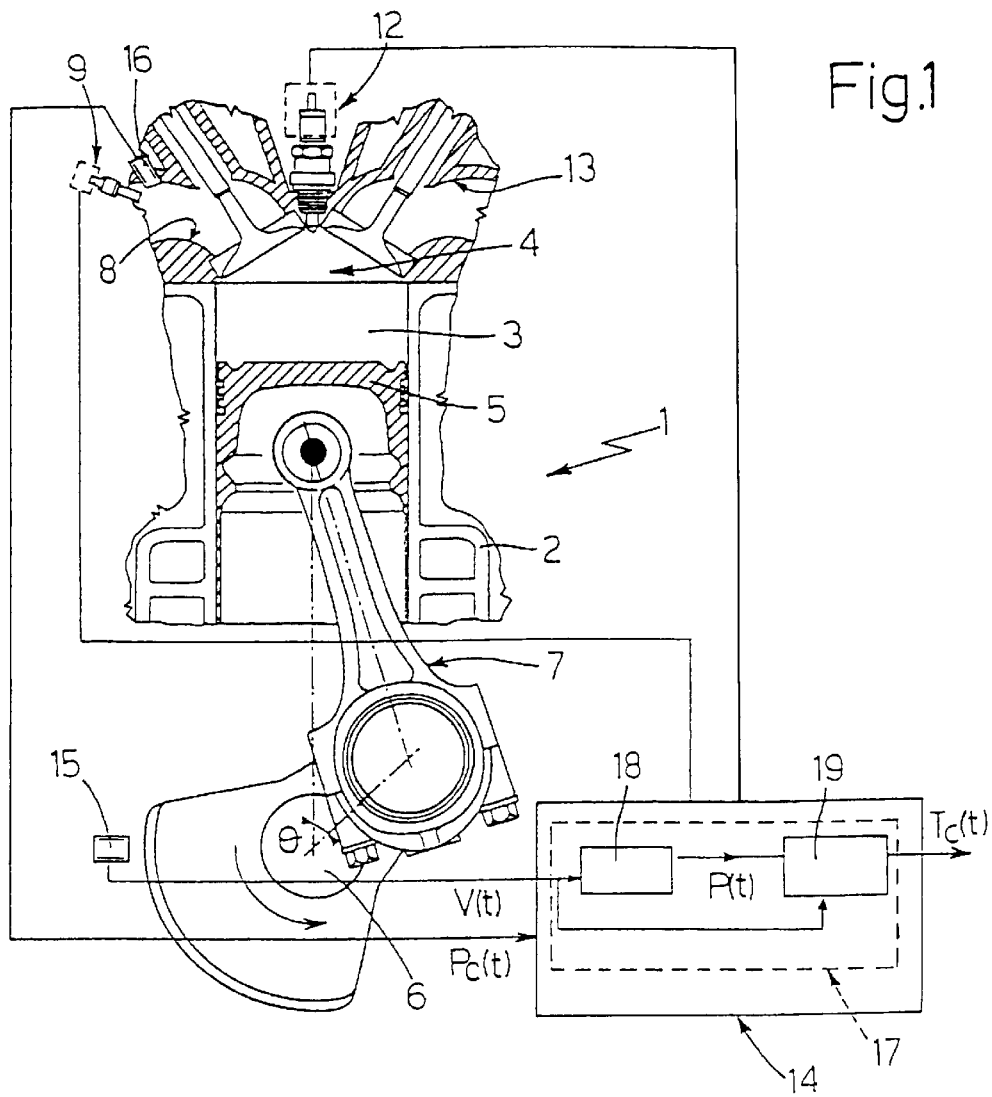
FIG. 1 shows in schematic form, with parts removed for the sake of clarity, an internal-combustion engine provided with a processing device which implements the method according to the present invention.

With reference to FIG. 1, 1 denotes in its entirety a "four-stroke" internal-combustion engine of the known type, comprising a support base 2 and a plurality of cylinders 3 (only one of which is shown) which are supported by the base 2 and define, at their top ends, respective combustion chambers 4. Each cylinder 3 has, mounted internally, a respective piston 5 which is connected to the crankshaft 6 by means of a respective connecting rod 7 in a known manner and is movable axially inside the cylinder 3 itself between an upper end-of-travel position (known as "top dead centre") and lower end-of-travel position (known as "bottom dead centre").

The engine 1 comprises an intake manifold 8 connected to the cylinders 3 in order to supply a flow of the combustion agent (air) into the cylinders 3 themselves, a device 9 for supplying the fuel into the cylinders 3, an ignition device 12 for triggering combustion inside the chambers 4 and an exhaust manifold 13 connected to the cylinders 3 for conveying away the combusted gases.

The engine 1 is controlled by a central control unit 14 co-operating with a plurality of sensors inside the engine block so as to receive at its input data signals representing physical parameters of the engine 1 such as, for example, the position of the butterfly valve, the temperature of the cooling liquid, and so on. In particular, in accordance with that shown in FIG. 1, the central control unit 14 is connected to a sensor 15 for the velocity of the crankshaft 6 which outputs a velocity signal v(t) representing the instantaneous angular velocity of the shaft 6 and to a pressure sensor 16 arranged along the intake duct 8 so as to produce a pressure signal Pc(t) representing the pressure inside the manifold 8 itself.

According to the present invention, the central control unit 14 comprises a processing device 17 which receives at its input the instantaneous angular velocity signal v(t) of the shaft 6 and is able to output a signal Tc(t) representing the load torque applied to the engine for each combustion cycle of the engine.

The processing device 17 comprises a circuit 18 which receives at its input the angular velocity signal v(t) and is able to output a signal P(t) indicating the pressure inside the cylinder 3. The device 17 comprises, moreover, a circuit 19 which receives at its input the signal v(t) and the signal P(t) and is able to output the signal Tc(t).

Below, with reference to FIG. 2, the circuit 18 which is able to reconstruct the progression of the pressure P(t) inside the cylinder 3 during a combustion cycle of the engine will be described.

Figure 2:
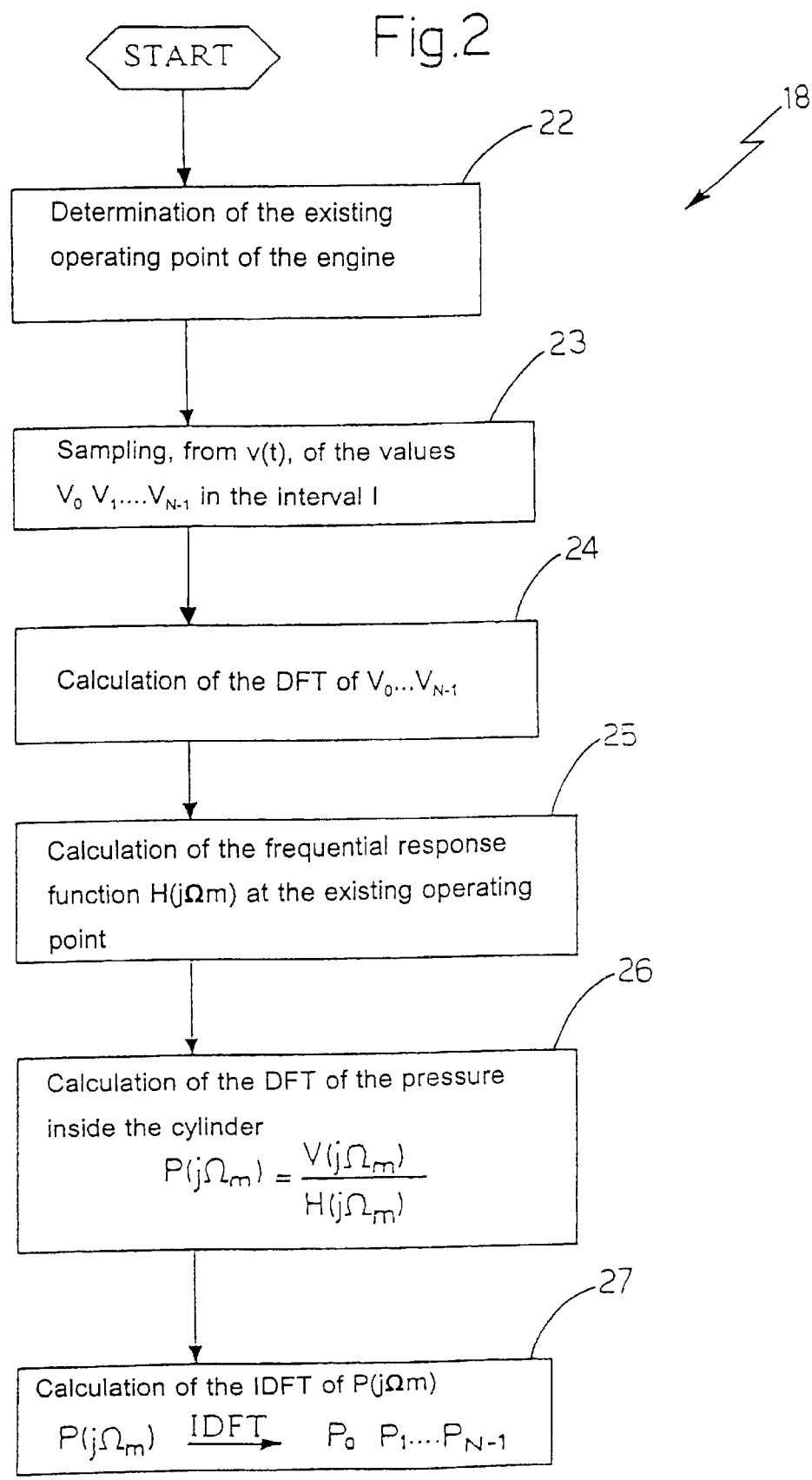
FIG. 2 shows in schematic form a block diagram of the operations performed by a first circuit forming part of the processing device according to FIG. 1.

With reference to FIG. 2, an initial START block is followed by a block 22 in which the existing operating point of the engine 1 is determined in relation to a set of operating parameters of the engine 1 itself.

In the example illustrated the existing operating point is determined by two operating parameters: the rpm of the engine (number of revolutions per minute) and the mean pressure Pcm inside the intake manifold 8. In particular, the existing operating point is determined on the basis of the values of the mean pressure Pcm and the rpm of the engine relating to the combustion cycle prior to the existing cycle, said values being available in that they are calculated by averaging the signal Pc(t) and the signal v(t).

It is obvious that it is possible to determine the existing operating point in relation to a different number of operating parameters or simply in relation to a different pair of parameters themselves.

The block 22 is followed by a block 23 in which a given number N of values of the signal v(t) indicating the instantaneous angular velocity are sampled; these sampled values, which are indicated below by $v_0, v_1, \ldots, v_{N-1}$, relate to a time interval I which is inside the combustion cycle and which comprises the instant at which the piston 5 is located at the top dead centre during ignition. In the example shown, the interval I corresponds to that time interval in which the angular position θ of the shaft 6 (FIG. 1) lies within an angular interval $I_\theta$ (FIG. 4) having an amplitude equal to 180° and centred in the angular position in which the piston 5 is located at the top dead centre.

The block 23 is followed by the block 24 in which the discrete Fourier transform v(jΩm) of the angular velocity signal v(t) "sampled" (or considered) in the interval I is calculated, in accordance with the expression:

$$V(j\Omega_m) = \sum_{n=0}^{N-1} v_n \cdot e^{-j(\Omega_m \cdot n)} \tag{1}$$

where Ωm is the angular frequency defined as $$\Omega_m = \frac{2 \cdot \pi \cdot m}{N} \tag{2}$$

where N is the abovementioned number of sample values of the signal v(t) sampled in the interval I and m is the number of the m-th harmonic present in the signal v(t) itself.

The block 24 is followed by a block 25 in which, as will be explained below, a frequential response function H(jΩm) relating to the existing operating point of the engine 1 and expressing the relationship between the progression of the angular velocity signal v(t) and the pressure signal p(t) inside the cylinder 3 in the domain of the angular frequencies is calculated. As will be explained more clearly below, a given frequential response function H(jΩm) is associated with each operating point of the engine.

The block 25 is followed by-the block 26 in which, based on the knowledge of the Fourier transform V(jΩm) and the frequential response function H(jΩm), the discrete Fourier transform P(jΩm) of the signal P(t) representing the pressure inside the cylinder 3 is calculated, in accordance with the expression:

$$P(j\Omega_m) = \frac{V(j\Omega_m)}{H(j\Omega_m)} \tag{3}$$

The block 26 is followed by a block 27 in which the anti-transformation operation in accordance with the Fourier transform P(jΩm) is performed so as to obtain the evolution of the signal P(t) for the pressure inside the cylinder 3 in the time interval I. In particular the anti-transformation operation is performed in accordance with the known expression:

$$p_n = \frac{1}{N} \sum_{m=0}^{N-1} P(j\Omega_m) \cdot e^{j(\Omega_m \cdot n)} \quad \text{with} \quad n = 0 \ldots N-1 \tag{4}$$

where $P_0, P_1, \ldots, P_{N-1}$ indicate the reconstructed values of the pressure inside the cylinder 3 at the instants when the values $v_0, v_1, \ldots, v_{N-1}$ within the time interval I were sampled.

In this way, by means of the signal P(t), and in particular by means of the values $P_0, P_1, \ldots, P_{N-1}$, the circuit 18 (FIG. 1) provides at its output the progression of the pressure P(t) inside the cylinder 3 for the time interval I and, basically, for the entire combustion cycle, the progression of the internal pressure itself outside the interval I during the intake and exhaust stages being known a priori.

In accordance with that described above, the relation (3) is therefore the key for being able to, reconstruct the internal pressure signal P(t) from the angular velocity signal v(t) output by the sensor 15. The relation (3) is based on the existence of a linear correlation, which has been proven experimentally, between the progression of the instantaneous angular velocity v(t) and the pressure p(t) inside a cylinder 3 in the interval I. Experimentally it has been noted that, in order to reconstruct the signal P(t) with a reasonable degree of approximation, it is possible to take into consideration only a certain number of harmonics, for example the first seven harmonics; as a result the expression (4), by means of which it is possible to determine the progression of the internal pressure, becomes:

$$p_n = \frac{1}{7} \sum_{m=0}^{6} P(j\Omega_m) \cdot e^{j(\Omega_m \cdot n)} \quad \text{with} \quad n = 0 \ldots N-1.$$

The calculation of the function H(jΩm), which is carried out in the block 25, is performed on the basis of the knowledge of a plurality of frequential response reference functions $H_R(j\Omega m)$, each of which relates to a respective reference operating point R of the engine 1 and is stored inside the processing device 17.

In particular, by representing the operating points R in the plane (rpm, Pcm) of the possible operating points of the engine (FIG. 3), the function H(jΩm) relating to the existing operating point (indicated by K in the plane (rpm, Pcm)) is calculated by taking into consideration a subgroup S of the points R. This subgroup S comprises the reference points R closest to the existing operating point K.

The function H(jΩm) relating to the point K is calculated by determining a weighted mean of the reference functions $H_R(j\Omega m)$ relating to the points R belonging to the subgroup S, in accordance with the expression $$H(j\Omega_m) = \sum_{R \in S} H_R(j\Omega_m) \cdot D_R \qquad (5)$$

where $D_R$ is the weight associated with the point R and is a function of the distance between the point R itself and the point K in the plane (rpm, Pcm).

Figure 3:
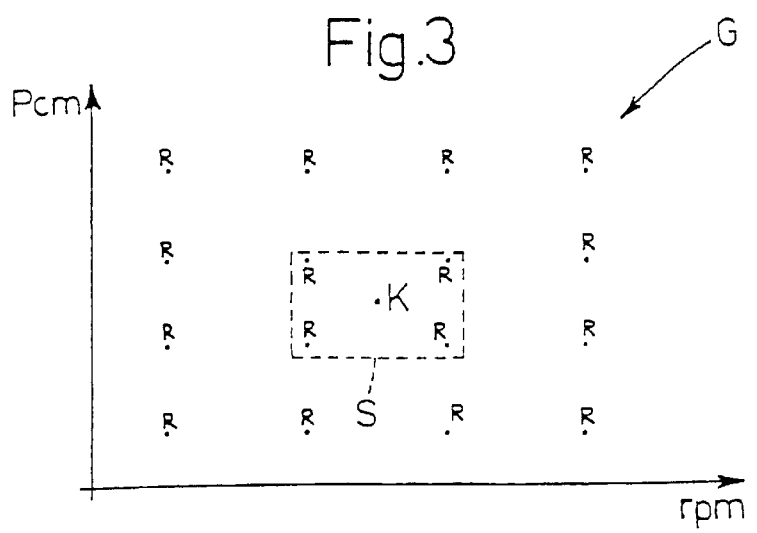
FIG. 3 shows a cartesian diagram representing the operating points of the engine according to FIG. 1.

In particular, in the example illustrated in FIG. 3, the reference points R are arranged so as to form a grid G and the subgroup S comprises the four points R which surround the existing operating point K.

To summarise, the calculation of the function $H(j\Omega m)$ relating to the existing operating point of the engine is thus performed (FIG. 3) as follows:

- the existing operating point K is determined in the plane (rpm, Pcm) (block 22);
- the subgroup S is determined by defining the reference points R closest to the point K,
- the weights $D_R$ are calculated as a function of euclidean distances between these points R and the point K in the plane (rpm-Pcm); and
- the function $H(j\Omega m)$ is calculated on the basis of the reference functions $H_R(j\Omega m)$ associated with the points R of the subgroup S in accordance with the expression (5).

From the above it can therefore be seen that, on the basis of the knowledge of the frequential response functions $H_R(j\Omega m)$ at the points R in the grid G, it is possible to determine the progression of the pressure P(t) inside the cylinder 3 during the combustion cycle, once the progression of the angular velocity v(t) in the interval I is known.

The reference functions $H_R(j\Omega m)$ at the reference points R, stored in the processing device 17, each express the relationship between the Fourier transform $V(j\Omega m)$ of the angular velocity signal v(t) and the Fourier transform $P(j\Omega m)$ of the internal pressure signal P(t) when the engine 1 is at the operating point R, namely:

$$H_R(j\Omega m) = \frac{V(j\Omega_m)}{P(j\Omega_m)}$$

These frequential response functions $H_R(j\Omega m)$ were obtained with reference to a sample engine having the same geometric and structural characteristics as the engine 1 (for example connecting-rod length, crank length, piston area, etc.). In fact, such a sample engine was equipped with a pressure sensor mounted inside the combustion chamber of the cylinder so as to produce directly at its output the signal P(t) for the pressure inside the cylinder. Once the operating parameters of the sample engine have been fixed so that the associated operating point coincides with the reference operating point R, the progressions of the instantaneous angular velocity v(t) and the internal pressure P(t) for the observation interval I are detected directly in the sample engine. At this point the Fourier transforms $V(j\Omega m)$ and $P(j\Omega m)$ of the angular velocity v(t) and the internal pressure P(t), respectively, are calculated and then the function $H_R(j\Omega m)$ relating to the point R is obtained simply from the relation:

$$H_R(j\Omega m) = \frac{V(j\Omega_m)}{P(j\Omega_m)}$$

Then, all the frequential response reference functions $H_R(j\Omega m)$ are determined with reference to the sample engine. These functions $H_R(j\Omega m)$ are stored in the processing device 17 of the engine 1 so that it is possible to determine the temporal progression of the pressure inside the cylinder 3 without installing any pressure sensor inside the combustion chamber 4.

Figure 5:
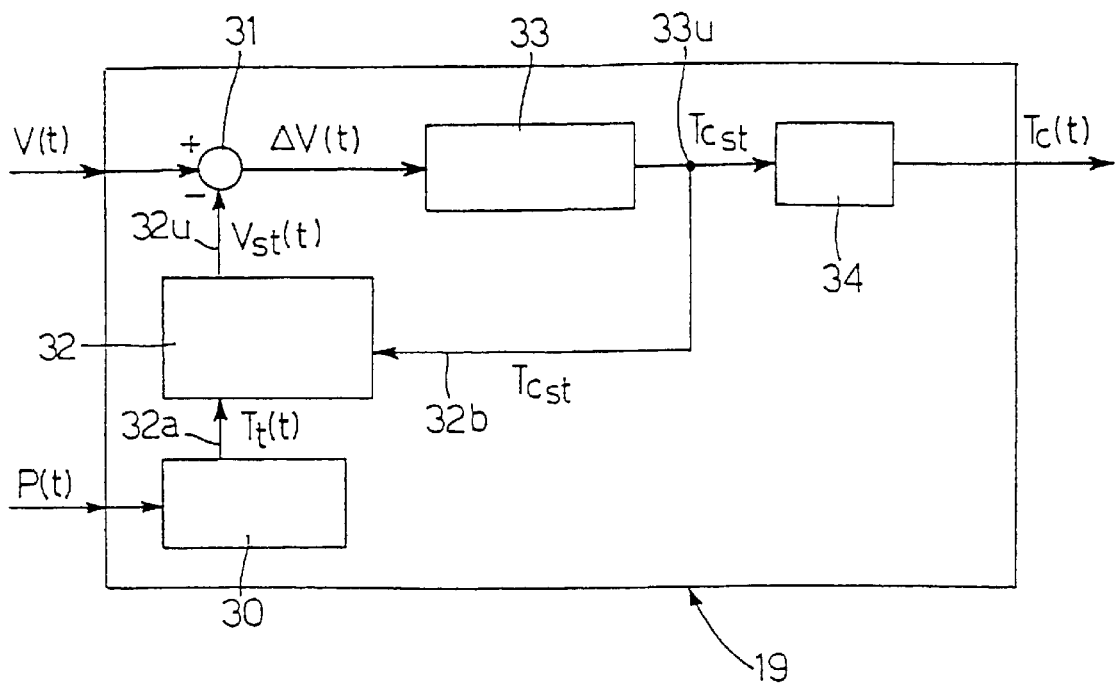
FIG. 5 shows in schematic form a second circuit forming part of the processing device according to FIG. 1.

With reference to FIG. 5 the circuit 19 (FIG. 1) able to determine the progression of the load torque Tc(t) from the angular velocity v(t) (measured by means of the sensor 15) and from the internal pressure P(t) (determined by means of the circuit 18) will now be described.

The internal pressure signal P(t) is supplied to a conversion circuit 30 of the known type, which is able to output a signal Tt(t) indicating the torque transmitted to the crankshaft 6. This conversion circuit 30 is able to determine the progression of the transmitted torque Tt(t) by applying the known law of the crank mechanism to the internal pressure P(t).

The angular velocity signal v(t), on the other hand, is supplied to an adder input of an adder node 31 which has, moreover, a subtracter input connected to the output 32u of a block 32 which models in a known manner the dynamic behaviour of the engine-load system from the rotational point of view. In particular, the block 32 has two inputs 32a and 32b, the input 32a of which receives the transmitted torque signal Tt(t) output by the conversion circuit 30, while the input 32b receives a signal $Tc_{st}(t)$ which, as will emerge clearly below, represents the estimated torque load. The block 32 is able to generate at its output 32u a signal $V_{st}(t)$ indicating the estimated angular velocity for the shaft 6 on the basis of the values assumed by the signals Tt(t) for the transmitted torque and $Tc_{st}(t)$ for the estimated load torque.

The node 31 is able to provide at its output a signal $\Delta v(t)$ defined by the difference between the signal v(t) output by the sensor 15 and the signal $v_{st}(t)$ indicating the angular velocity estimated on the basis of the engine-load model. This signal $\Delta v(t)$ represents the error in angular velocity which exists between the angular velocity v actually measured and the angular velocity $v_{st}$ estimated on the basis of the reconstructed transmitted torque Tt(t) and the estimated load torque $Tc_{st}(t)$.

The error signal $\Delta v$ is supplied to an estimator circuit 33 which is able to process it so as to provide the estimated load torque signal $Tc_{st}$ at its output 33u. The output 33u is fed back to the input 32b of the block 32 so as to allow the block 32 itself to receive the estimated load torque signal $Tc_{st}$.

The estimator circuit 33 (described in detail below) is designed to operate in such a way that the estimate of the load torque $Tc_{st}$ is changed so that the estimated angular velocity $v_{st}$ tends to reach the measured angular velocity v.

The output 33u, moreover, is connected to a low-pass filter 34 designed to eliminate high-frequency spectral components from the signal $Tc_{st}$ so as to output the signal Tc, namely the reconstructed load torque which is actually applied to the engine.

Figure 7:
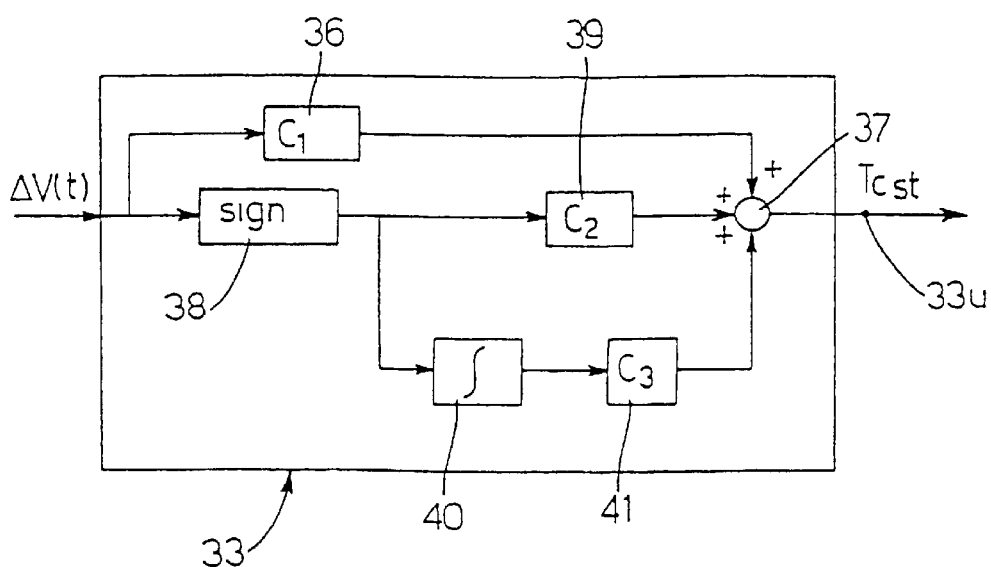
FIG. 7 shows a circuit diagram of a block forming part of the second circuit according to FIG. 5.

FIG. 7 shows the circuit diagram of the estimator circuit 33 which is formed using the sliding mode technique and, in the example illustrated, is of the proportional-integral type. In particular, the circuit 33 has a multiplier block 36 which receives at its input the signal $\Delta v$, is able to multiply said signal by a parameter $C_1$ which can be calibrated and is connected at its output to an adder node 37.

Moreover, the circuit 33 has two blocks 38 and 39 which are arranged in series and the block 38 of which receives at its input the signal $\Delta v$ and provides at its output the "sign" of the difference between the measured velocity signal v and the estimated angular velocity signal $v_{st}$. The block 39, on the other hand, is a multiplier block which is able to multiply the output of the block 38 by a parameter $C_2$ which can be calibrated, before supplying it to the adder node 37.

Finally, the circuit 33 has an integrator 40 and a multiplier 41 which are arranged in series and the integrator 40 of which receives at its input the output of the block 38, while the multiplier 41 is able to multiply the output signal of the integrator 40 itself by a parameter $C_3$ which can be calibrated and then supply it to the adder node 37. The output of the node 37 defines the output 33u of the estimator circuit 33 and provides the estimated load torque $Tc_{st}$ which is then calculated in accordance with the expression:

$$Tc_{st}=C_1 \cdot \Delta v + C_2 \cdot sign(\Delta v) + C_3 \cdot \int sign(\Delta v)$$

where "sign" is the sign function belonging to the block 38.

Below, operation of the circuit 19 which is able to reconstruct the load torque Tc(t) from the measured angular velocity v(t) and the internal pressure P(t) will be described.

Once the reconstructed internal pressure P is known, the transmitted torque Tt is determined by means of the conversion circuit 30 and it is supplied to the block 32 which models the engine-load system.

At this point the input 32b of the block 32 provides a first trial load torque Tc which is, for example, calculated as an offset value with respect to the reconstructed transmitted torque Tt. The block 32, in response to these inputs, provides at its output a first estimate of the angular velocity, namely the angular velocity which the shaft 6 should have in order to balance the reconstructed transmitted torque Tc with the trial load torque Tc.

The adder node 31 then calculates the velocity error $\Delta v$ existing between the measured velocity and the estimated velocity and supplies this error to the estimator circuit 33. The circuit 33 in turn processes this velocity error $\Delta v$ so as to output a second trial load torque which will be fed back to the input 32b of the block 32. This feedback will result in correction of the estimate of the angular velocity output from the block 32. At this point, the operations described above are repeated until the velocity error $\Delta v$ becomes approximately zero.

When the estimated angular velocity (output from the block 32) is equal to the measured angular velocity, the estimated load torque output from the circuit 33 is approximately equal to the load torque which is actually applied to the engine and, consequently, the process for determination of the load torque ends.

It should be emphasized that the rapid convergence of the process which results in the load torque being obtained (namely the rapid convergence, to zero, of the velocity error $\Delta v$) is ensured by the estimator circuit 33 (FIG. 7), the control action of which, as already specified above, is expressed by the relation:

$$Tc_{st}=C_1 \cdot \Delta v + C_2 \cdot sign(\Delta v) + C_3 \cdot \int sign(\Delta v)$$

In fact, the term $C_1 \cdot \Delta v$ has the function of forcing the load torque estimate to change so as to nullify the velocity error $\Delta v$ as quickly as possible, while the terms $C_2 \cdot sign(\Delta v)$ and $C_3 \cdot \int sign(\Delta v)$ associated with the sign of the error $\Delta v$ perform a control action aimed at ensuring that, after a certain number of oscillations about the final value of the estimate for the load torque, the estimated load torque coincides with the final value itself.

From what has been described above it can be seen that in the engine 1, which is intended to be a mass-produced vehicle engine, it is possible to determine the progression of the load torque applied to the engine, cycle after cycle, on the basis solely of the measurement of the angular velocity of the crankshaft and without the aid of any sensor on the outside of the engine block such as, for example, a pressure sensor mounted directly inside the combustion chamber or a piezoelectric accelerometer.

Figure 4:
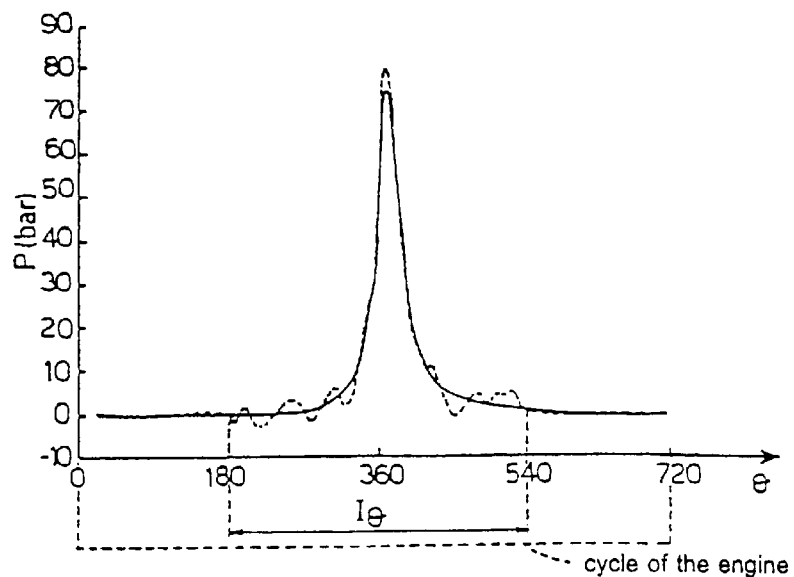
FIG. 4 shows the progression of the pressure inside a cylinder of the engine as a function of the angular position of the crankshaft during a combustion cycle.
Figure 6:
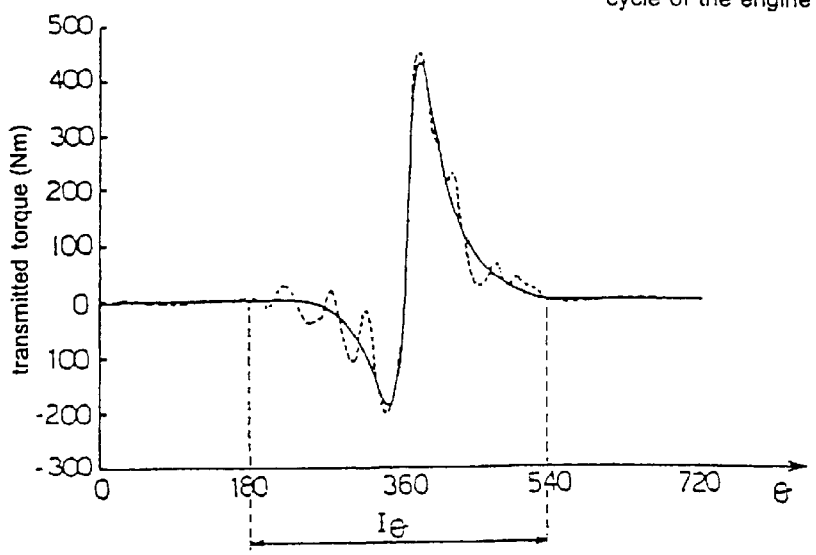
FIG. 6 shows the progression of the torque transmitted to the crankshaft as a function of the angular position of the crankshaft during a combustion cycle.
Figure 8:
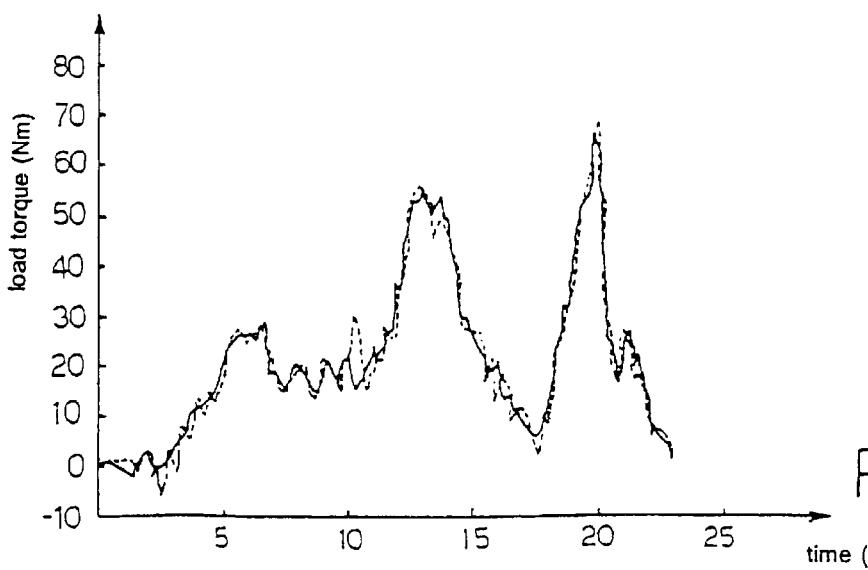
FIG. 8 shows a progression of the load torque reconstructed in accordance with the method according to the present invention.

In accordance with that illustrated with reference to FIGS. 4, 6 and 8, by means of the method according to the present invention it is possible to reconstruct the progressions of the pressure inside the cylinder (FIG. 4), the torque transmitted to the crankshaft 6 (FIG. 6) and the load torque (FIG. 8) with an excellent degree of approximation. In fact, representing graphically as a continuous line the progressions of the internal pressure P and the transmitted torque Tt as a function of the angular position $\theta$ of the shaft 6, it is possible to note that these progressions do not deviate significantly from the progressions which are obtained by measuring directly these parameters (shown in broken lines in FIGS. 4 and 6). Similarly, with reference to FIG. 8, representing graphically as a continuous line the reconstructed progression of the load torque Tc as a function of time, it is possible to note that this progression does not deviate significantly from the actual progression which is obtained by measuring the load torque (shown in broken lines).

As a result of the method described it is therefore possible to determine the evolution of the internal pressure, the transmitted torque and the load torque without having to incur costs due to the installation of sensors outside the engine block itself and on the basis solely of measurements of the angular velocity of the crankshaft. This ensures that the method can be applied to mass-produced engines in a simple and low-cost manner.

What is claimed is:

1. A method for determining a progression of load torque in an internal-combustion engine having at least one crankshaft, intake manifold, piston, and cylinder during a combustion cycle having an ignition phase, the method comprising the steps of:

detecting a progression of instantaneous angular velocity (v(t)) of the crankshaft of the engine;

determining an existing operating point (K) of the engine as a function of a set of operating parameters of the engine;

obtaining a progression of pressure (P(t)) inside the cylinder from the progression of the instantaneous angular velocity (v(t)) and from a transfer function (H(j$\Omega$m)) that relates to the existing operating point (K) and correlates the pressure (P(t)) inside the cylinder to the instantaneous angular velocity (v(t));

determining a progression of load torque (Tc(t)) as a function of the progression of the instantaneous angular velocity (v(t)) and the progression of the said internal pressure (P(t)), wherein determining a relevant transfer function (H(j$\Omega$m)) for each operating point comprises the preliminary steps of:

determining a plurality of reference operating points (R) of the engine, each of the plurality of reference operating points being a function of the operating parameters of the engine, and determining, for each of the plurality of reference operating points (R), a respective reference transfer function ($H_R$(j$\Omega$m)) for the pressure (P(t)) inside the cylinder and the instantaneous angular velocity (v(t)) of the crankshaft, and wherein the transfer function (H(j$\Omega$m)) for the internal pressure (P(t)) and the said instantaneous angular velocity (v(t)) of the crankshaft at the existing operating point (K) of the engine is calculated by processing at least some of the reference transfer functions ($H_R(j\Omega m)$) relating to reference operating points (R) which are closest to the existing operating point (K);

obtaining a progression of the torque (Tt(t)) transmitted to the crankshaft from the progression of the pressure (P(t)) inside the cylinder;

assigning a trial load torque (Tcst) to a first input of a block that models the dynamic behavior of a system defined by a combination of engine and load, the block having a second input receiving the torque (Tt(t)) transmitted to the crankshaft;

estimating, using the block, an angular velocity of the crankshaft (Vst) as a function of the trial load torque (Tcst) and the torque (Tt(t)) transmitted to the crankshaft, the estimated angular velocity being a velocity at which the crankshaft should travel in order to balance the transmitted torque (Tt(t)) with the trial load torque (Tcst);

comparing the measured angular velocity (v) with the estimated angular velocity (Vst) and generating a velocity error signal ($\Delta v$);

correcting the trial load torque (Tcst) by means of an estimator circuit which receives at its input the velocity error signal ($\Delta v$) and estimates the load torque (Tcst) based the velocity error signal ($\Delta v$); and repeating the above steps of estimating, comparing and generating, and correcting until the velocity error signal ($\Delta v$) is approximately equal to zero so that the trial load torque (Tcst) outputted by the estimator circuit is approximately equal to the load torque actually applied to the engine.

2. The method according to claim 1, wherein the operating parameters of the engine comprise a mean angular velocity (rpm) of the crankshaft and a mean pressure (Pcm) in the intake manifold of the engine.

3. The method according to claim 2, wherein the mean angular velocity (rpm) of the crankshaft and the mean pressure (Pcm) in the intake manifold define a plane of possible operating points of the engine, each of the possible operating points of the engine being represented by a respective point in the plane, and wherein the reference operating points (R) of the engine define a grid (G) in the plane.

4. The method according to claim 3, further comprising the step of defining on the grid (G), a subgroup (S) of the reference operating points (R) comprising the reference operating points (R) which are closest to the existing operating point (K) in the plane (rpm-Pcm), wherein the transfer function ($H(j\Omega m)$) at the existing operating point (K) is calculated as a weighted mean of the reference transfer functions ($H_R(j\Omega m)$) relating to the reference operating points (R) of the subgroup (S), each reference transfer function ($H_R(j\Omega m)$) acting in the weighted mean with a weight which is a function of a Euclidean distance between the corresponding reference operating point (R) and the existing operating point (K).

5. The method according to claim 1, wherein the transfer function ($H(j\Omega m)$) is a frequential response function for the internal pressure (P(t)) and the instantaneous angular velocity (v(t)).

6. The method according to claim 5, wherein the step of detecting the progression of the instantaneous angular velocity (v(t)) is performed by sampling, for each combustion cycle of the engine, the instantaneous angular velocity (v(t)) at a plurality of sampling instants, and obtaining a plurality of measured values ($V_0, V_1, \ldots, V_{N-1}$).

7. The method according to claim 6, wherein the substep of obtaining the progression of the internal pressure (P(t)) comprises the further substeps of:

calculating a discrete Fourier transform of the angular velocity ($V(j\Omega m)$) on the basis of the plurality of measured values ($V_0, V_1, \ldots, V_{N-1}$);

applying the transfer function to the Fourier transform of the angular velocity ($V(j\Omega m)$) so as to obtain a Fourier transform of the pressure ($P(j\Omega m)$) inside the cylinder;

calculating a Fourier anti-transform of the Fourier transform of the internal pressure ($P(j\Omega m)$) so as to obtain a plurality of estimated values of internal pressure ($P_0, P_1, \ldots, P_{N-1}$) at the sampling of the instantaneous angular velocity (v(t)), wherein the plurality of estimated values of the internal pressure ($P_0, P_1, \ldots, P_{N-1}$) define the progression of the pressure (P(t)) inside the cylinder.

8. The method according to claim 7, wherein the sampling of the instantaneous angular velocity (v(t)) is performed, for each combustion cycle of the engine, in a time interval (I) during which the piston associated with the cylinder moves in a predefined vicinity of top dead center during the ignition phase of the engine.

9. The method according to claim 1, further comprising the step of filtering the estimated load torque (Tcst) output by the estimator circuit to eliminate high-frequency spectral components.

10. The method according to claim 1, wherein the step of correcting the trial load torque (Tcst) is performed by processing the velocity error signal ($\Delta v$) proportionally and integrally using the estimator circuit.

11. The method according to claim 10, wherein the estimated load torque (Tcst) is calculated by the estimator circuit as a function of the velocity error signal ($\Delta v$) in accordance with the expression:

$$Tcst = C_1 \cdot \Delta v + C_2 \cdot sign(\Delta v) + C_3 \cdot \int sign(\Delta v)$$

wherein sign ($\Delta v$) represents a sign function of time velocity error $\Delta v$ and $C_1$, $C_2$ and $C_3$ are calibrated parameters.

12. A method for determining a progression of load torque in an internal-combustion engine having at least one crankshaft and cylinder during a combustion cycle, the method comprising the steps of:

detecting a progression of instantaneous angular velocity (v(t)) of the crankshaft of the engine;

detecting a progression of pressure (P(t)) inside the cylinder; and determining a progression of load torque (Tc(t)) as a function of the progression of the instantaneous angular velocity (v(t)) and the progression of the said internal pressure (P(t));

obtaining a progression of torque (Tt(t)) transmitted to the crankshaft from the progression of the pressure (P(t)) inside the cylinder;

assigning a trial load torque (Tcst) to a first input of a block that models the dynamic behavior of a system defined by a combination of engine and load, the block having a second input receiving the torque (Tt(t)) transmitted to the crankshaft;

estimating, using the block, the angular velocity of the crankshaft (Vst) as a function of the trial load torque (Tcst) and the torque (Tt(t)) transmitted to the crankshaft, wherein the estimated angular velocity is the velocity at which the crankshaft should travel in order to balance the transmitted torque (Tt) with the trial load torque ($Tc_{st}$);

comparing the measured angular velocity (v) with the estimated angular velocity (Vst) and generating a velocity error signal ($\Delta v$);

correcting the trial load torque (Tcst) using an estimator circuit that receives at its input the velocity error signal ($\Delta v$) and estimates the load torque (Tcst) based on the velocity error signal ($\Delta v$); and repeating the above steps of estimating, comparing and generating, and correcting until the velocity error signal ($\Delta v$) is approximately equal to zero so that the trial load torque (Tcst) output by the estimator circuit is approximately equal to the load torque actually applied to the engine.

13. The method according to claim 12, further comprising the step of filtering the estimated load torque (Tcst) output by the estimator circuit to eliminate high-frequency spectral components.

14. The method according to claim 12, wherein the step of correcting the trial load torque (Tcst) is performed by processing the velocity error signal ($\Delta v$) proportionally and integrally using the estimator circuit.

15. The method according to claim 14, wherein the estimated load torque (Tcst) is calculated by the estimator circuit as a function of the velocity error signal ($\Delta v$) in accordance with the expression:

$$\text{Tcst} = C_1 \cdot \Delta v + C_2 \cdot \text{sign}(\Delta v) + C_3 \cdot \int \text{sign}(\Delta v)$$

wherein sign ($\Delta v$) represents a sign function of time velocity error $\Delta v$ and $C_1$, $C_2$ and $C_3$ are calibrated parameters.

* * * * *

UNITED STATES PATENT AND TRADEMARK OFFICE
CERTIFICATE OF CORRECTION

PATENT NO. : 6,354,149 B1
DATED : March 12, 2002
INVENTOR(S) : Gabriele Serra, Roberto Flora, Giorgio Minelli, Piero Azzoni and Davide Moro It is certified that error appears in the above-identified patent and that said Letters Patent is hereby corrected as shown below:

<u>Title page,</u>
Item [75], should read -- [75] Inventors: Gabriele Serra, S. Lazzaro Di Savena; Roberto Flora, Forli'; Giorgio Minelli, Bologna; Piero Azzoni, S. Lazzaro Di Savena; Davide Moro, Bologna, all of (IT) --

Signed and Sealed this

Twenty-third Day of July, 2002

*Attest:*

*Attesting Officer*

JAMES E. ROGAN
*Director of the United States Patent and Trademark Office*